United States Patent

[11] 3,620,557

| [72] | Inventor | Rolf Gustav Sturm |
| | | Munich, Germany |
| [21] | Appl. No. | 838,159 |
| [22] | Filed | July 1, 1969 |
| [45] | Patented | Nov. 16, 1971 |
| [73] | Assignee | Entwicklungsring Sud GmbH |
| | | Munich, Germany |
| [32] | Priority | July 3, 1968 |
| [33] | | Germany |
| [31] | | P 17 56 722.5 |

[54] APPARATUS FOR CONDUCTING GAS
2 Claims, 1 Drawing Fig.

[52] U.S. Cl. ............................................ 285/228
[51] Int. Cl. ..................................... F16l 27/12, F16l 51/02
[50] Field of Search ................................. 285/228, 227, 226

[56] References Cited
UNITED STATES PATENTS
2,479,104  8/1949  Dreyer ........................ 285/228
3,315,704  4/1967  Shire .......................... 285/226 X FOREIGN PATENTS
1,401,419  4/1965  France ........................ 285/228
847,783  9/1960  Great Britain ................ 285/227
258,088  2/1949  Switzerland ................. 285/228

Primary Examiner—Thomas F. Callaghan
Attorney—William K. Serp

ABSTRACT: An apparatus for compensating for the thermal expansion of a gas duct. Two ducts are coaxially positioned for sliding engagement. The inner duct is provided with a pair of parallel, outwardly projecting flanges. The end of the outer duct is provided with an outwardly disposed flange, the ends of which are formed to define a cylindrical segment coaxial with the inner duct. The free end of the cylindrical segment is inwardly formed to define an inwardly disposed flange which is positioned between the pair of flanges projecting from the surface of the inner duct. Cylindrically shaped accordion bellows are secured to the adjacent surfaces of the flanges so as to define three pressure chambers.

PATENTED NOV 16 1971
3,620,557
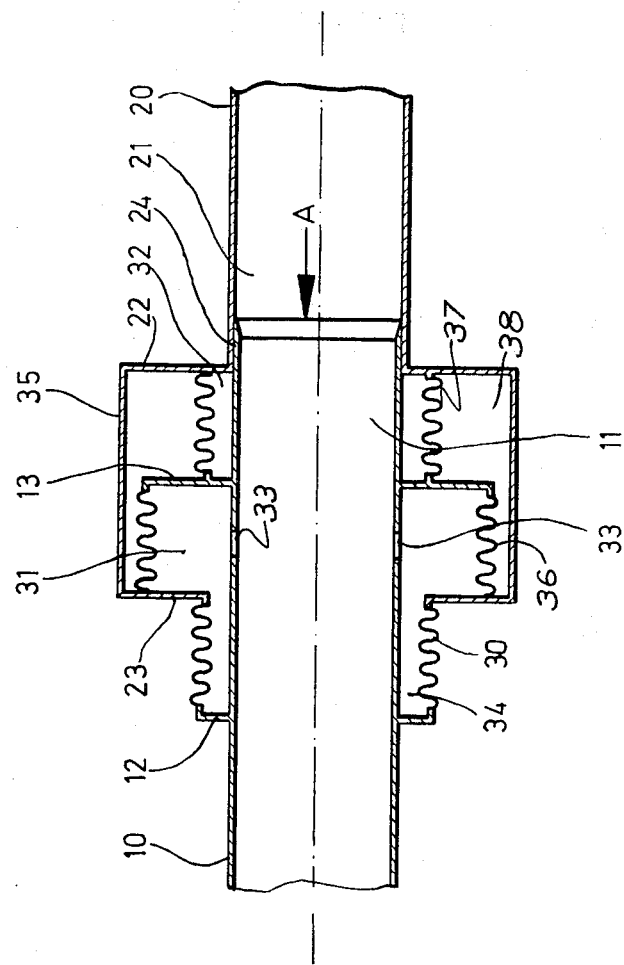

APPARATUS FOR CONDUCTING GAS

BACKGROUND OF THE INVENTION

This invention relates to an apparatus for compensating for the thermally caused elongation of a gas duct and additionally includes a pressure relief means. The apparatus is particularly adapted for use between the gas generators and lift fans of air and space vehicles.

In the past, compensation for any variation in the length of gas ducts caused by fluctuating temperature conditions was of necessity associated with a release of forces which varied with duct pressure. Absorption of these forces generally required tension rods or other complicated structures.

It is a main object of the present invention to provide an apparatus which will compensate for any expansion in gas conducting ducts without the necessity of utilizing such force release means. This object is achieved by providing flanged members on the end pieces of the ducts. The adjacent surfaces of the flanges are joined together by accordion bellows. In this manner, a counterpressure chamber as well as a forward and a rear pressure chamber is formed. The counterpressure chamber is connected by holes to the mainstream of the duct in order to provide pressure relief. The forward pressure chamber serves to capture any gas escaping at the sliding joint, while the rear chamber serves to receive any gas escaping from the counterpressure chamber. The bellows are preferably constructed of heat-resistant, high-strength elastic synthetic material. The apparatus described is one which provides a reliable means for compensating for length variations in a gas conducting duct which prevents gas loss, maintains the constant pressure conditions and permits a saving in weight compared to arrangements heretofore known. The latter is of particular importance in aircraft construction.

Other objects and advantages of the invention will become apparent with reference to the following description and accompanying drawing which shows an illustrated embodiment of this invention.

BRIEF DESCRIPTION OF THE DRAWINGS

FIG. 1 is a full sectional view of an apparatus embodying certain features of this invention.

DESCRIPTION OF THE PREFERRED EMBODIMENT

In order to accommodate for thermal expansion, the ends of a pair of ducts 10 and 20 are arranged so that the end of the inner duct 10 forms a sliding fit with the end of the outer duct 20. The internal gas pressure, acting in the direction of arrow A, tends to urge the ducts 10 and 20 apart. This internal pressure is partially bled through the holes 33 of duct 10 into the counterpressure chamber 31 where it acts upon an apparatus carried by the end sections 11 and 21 of ducts 10 and 20 respectively. Spatially positioned and secured to the end section 11 of the duct 10 are two parallel, outwardly extending flanges 12 and 13. Secured to the end section 21 of the duct 20 is an outwardly extending flange 22. The outer end of the flange is formed to define a cylindrical segment 35 which is coaxial with the ducts 10 and 20 and which surrounds the flange 13 of the duct 10. The free end of the cylindrical segment 35 is inwardly formed so as to provide an inwardly disposed flange 23 which is positioned between the flanges 12 and 13 upon the duct 10. The adjacent surfaces of the flanges 12 and 23 are connected by means of cylindrically shaped accordion bellows 30. The facing, adjacently disposed surfaces of the flanges 13 and 23 are similarly connected by means of a cylindrically shaped accordion bellows 36. Additionally, the adjacently disposed surfaces of the flanges 13 and 22 are similarly connected by means of cylindrically shaped accordion bellows 37 as illustrated in FIG. 1.

Each of the bellows 30, 36 and 37 are preferably constructed of heat-resistant, high-strength elastic synthetic material. The flanges 13, 22 and 23 and bellows 36 and 37 serve to define a rear gas chamber 38. Similarly, flanges 22 and 13 and bellows 37 serve to define a forward gas chamber 32. The bellows, to a limited degree, are capable of longitudinal expansion and thus serve to compensate for the thermal expansion of the ducts 10 and 20.

The pressure maintained within counterpressure chamber 31 reacts upon the surface of flange 13 and thereby effects a pressure relief of the overall apparatus. The rear chamber 38 serves to capture and further prevent gas escape from the counterpressure chamber 31, while the forward chamber 32 serves to collect any gas which escapes at the sliding surfaces 24 of the ducts 10 and 20. The illustrated apparatus permits the ducts 10 and 20 to slide with respect to each other in a relatively free manner since the force required to move the bellows is relatively inconsequential.

Although only one specific embodiment of this invention has been shown and described herein, it will be understood that certain details of the construction shown may be altered without departing from the spirit and scope of this invention.

I claim:

1. An apparatus for compensating for relative longitudinal movement of sections of a high-pressure air duct comprising slidably engaged telescoping inner and outer duct sections, a first flange radially outwardly projecting from the end of said outer duct section, a second flange radially outwardly projecting from the outer surface of said inner duct section, a first cylindrically shaped accordion bellows secured to and spanning the distance between the adjacent surfaces of said first and second flanges, a cylindrical segment secured to the outer edge of said first flange, and extending over and beyond said second flange, a third flange secured to the free end of said cylindrical segment and disposed radially inwardly, a second cylindrically shaped accordion bellows secured to and spanning the distance between the adjacent surfaces of said second and third flanges, a fourth flange secured to and radially outwardly extending from the surface of said inner duct section and a third cylindrically shaped accordion bellows secured to and spanning the distance between said third and fourth flanges, said inner duct section, said second and third bellows and said second, third and fourth flanges defining a counterpressure chamber, with substantial portions of said second and third flanges defining reaction surfaces in said chamber, one of said duct sections having an opening therein communicating said counterpressure chamber and the interior of said ducts.

2. An apparatus in accordance with claim 1 wherein said first, second and third bellows are constructed of a heat-resistant, high-strength elastic synthetic material.

* * * * *